Dec. 12, 1933.  M. ROMAINE ET AL  1,938,783
MILLING MACHINERY
Filed Aug. 28, 1926   8 Sheets-Sheet 3

Inventors
Millard Romaine
Walter D. Archea
By A. H. K. Parsons
Attorney

Dec. 12, 1933.     M. ROMAINE ET AL     1,938,783
MILLING MACHINERY
Filed Aug. 28, 1926     8 Sheets-Sheet 4

Fig. 4

Inventors:
Millard Romaine
Walter D. Archea
By
A. K. Parsons
Attorney

Dec. 12, 1933. M. ROMAINE ET AL 1,938,783
MILLING MACHINERY
Filed Aug. 28, 1926   8 Sheets-Sheet 7

Inventors
Millard Romaine
Walter D. Archea
By AHK Parsons
Attorney

Patented Dec. 12, 1933

1,938,783

UNITED STATES PATENT OFFICE 1,938,783

MILLING MACHINERY

Millard Romaine and Walter D. Archea, Cincinnati, Ohio, assignors to The Cincinnati Milling Machine Company, Cincinnati, Ohio, a corporation of Ohio Application August 28, 1926. Serial No. 132,128

15 Claims. (Cl. 90—21)

This invention relates to milling machinery and has particular reference to a novel and improved machine for performing simultaneous cutting operations on a plurality of work pieces.

One of the objects of the present invention is the provision of a machine for producing flutes or ribs on a plurality of shaft members.

A further object of the invention is the provision of novel and improved work indexing or positioning mechanism for satisfactorily successively presenting different peripheral portions of a work piece to the cutting member or members.

Another object of the invention is the provision of extremely accurate multiple index mechanism for shifting the work pieces to successive positions automatically, with an accuracy within a thousandth part of an inch.

An additional object of the invention is the provision of novel and improved work control mechanism for simultaneously engaging or releasing a plurality of work pieces and for positively locking the work pieces in position during the operation of the machine.

Other objects and advantages of the present invention should be readily apparent by reference to the following specification taken in connection with the accompanying drawings forming a part thereof, and it will be understood that any modifications in the specific structural details hereinafter illustrated and described may be made within the scope of the appended claims without departing from or exceeding the spirit of the invention.

Figure 16 is a vertical section as on line 16—16 of Figure 15, Figure 17 is a section on line 17—17 of Figure 16, and, Figure 18 is a sectional view of a workpiece illustrating the engagement of the multiple rib cutters therewith.

Figure 1:
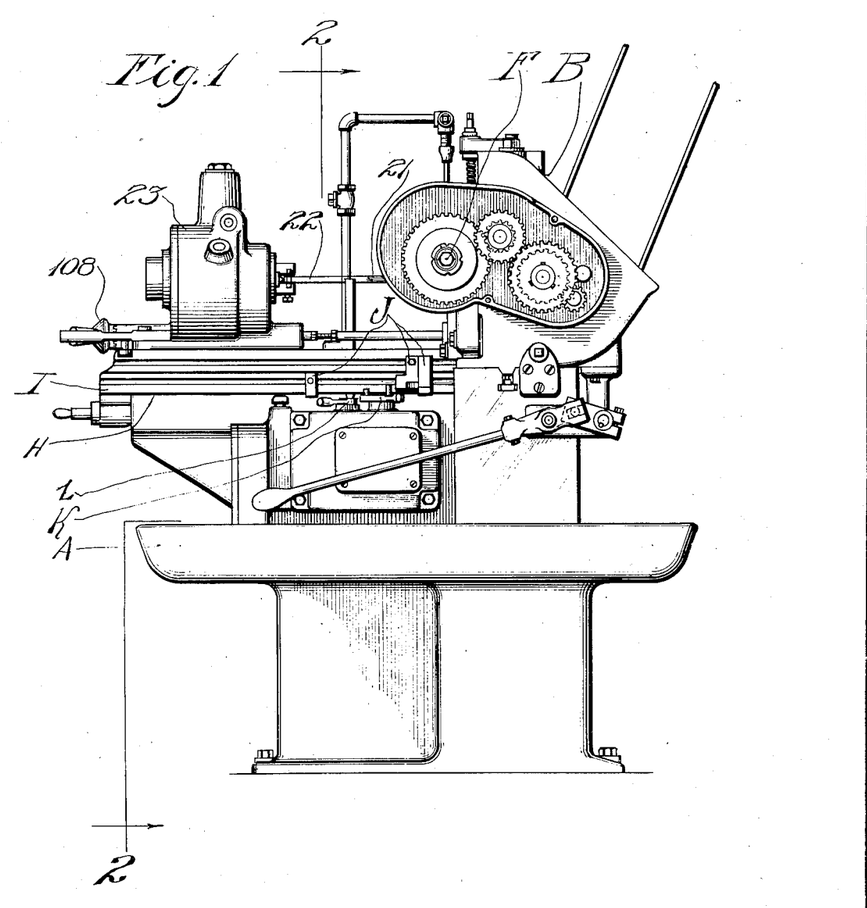
Figure 1 is a side elevation of a machine embodying the present invention.
Figure 2:
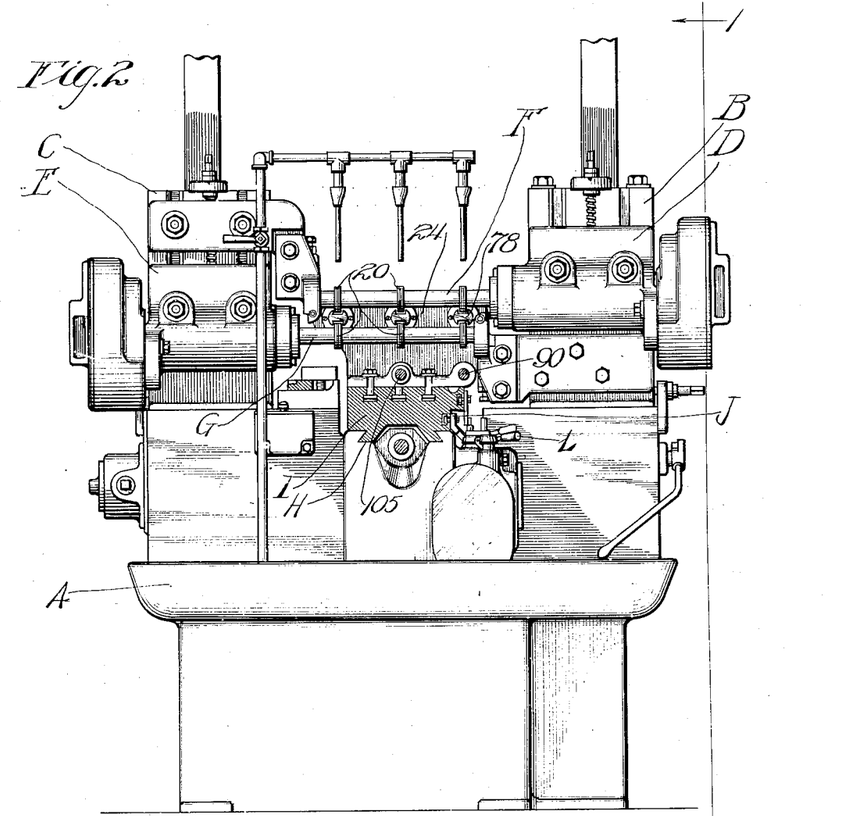
Figure 2 is a view thereof partly in section and partly in elevation as on the line 2—2 of Figure 1.

In the drawings in which similar characters of reference are employed to denote corresponding parts throughout the several views, the reference character A designates the bed of a machine, provided with the upright column portions B and C, supporting the adjustable spindle heads D and E for the cutter spindles F and G respectively. Each of these spindles are provided with a plurality of cutters 20, disposed in pairs, which is to say a cutter on spindle F being located above and in opposition to a cutter on spindle G, whereby the cutters are adapted to work simultaneously on the upper and under faces of a work piece. These cutters as shown, are so formed in transverse configuration as to produce a number of ribs or splines 21 on a shaft or work piece 22. As indicated, it is intended that the work piece shall be provided with these splines about its entire periphery, to the number of possibly twenty-five or thirty such splines for example. It is of course, impossible to produce all of these by a single cutting operation. The purpose of the present invention, however, is to reduce to a minimum the number of cuts required for the production of these splines. This is accomplished by shaping both the upper and lower cutters to produce a maximum number of splines for practicable purpose at each cut and to then move the work piece out of position between the cutters and so index it that the cutters will overlap the last cut made and at the same time produce a number of additional splines as a back and forth movement is imparted to the work. In this way by simultaneously cutting and automatically indexing the work it is possible to form the complete series with a minimum number of indexing movements and with extreme accuracy. In the accomplishment of this result, the bed A is provided with ways H for the reciprocable table I, preferably power actuated and having its reciprocations controlled as by dogs J on the table cooperating with control elements K and L on the side of the machine. As the machine proper, including these elements, is a well known commercial article it is felt detailed description of the controls is unnecessary, mention being merely made of the fact that they and so adjusted as to cause an automatic inward or feeding movement and an outward movement of the table and work with respect to the cutters to an extent to free the work from the cutters and permit of satisfactory indexing thereof, when the working stroke is repeated until operation of the machine is manually checked. The table, as indicated in Figure 1, is provided with a headstock mechanism within the casing 23 and tailstock mechanism as contained in casing 24.

Figure 4:
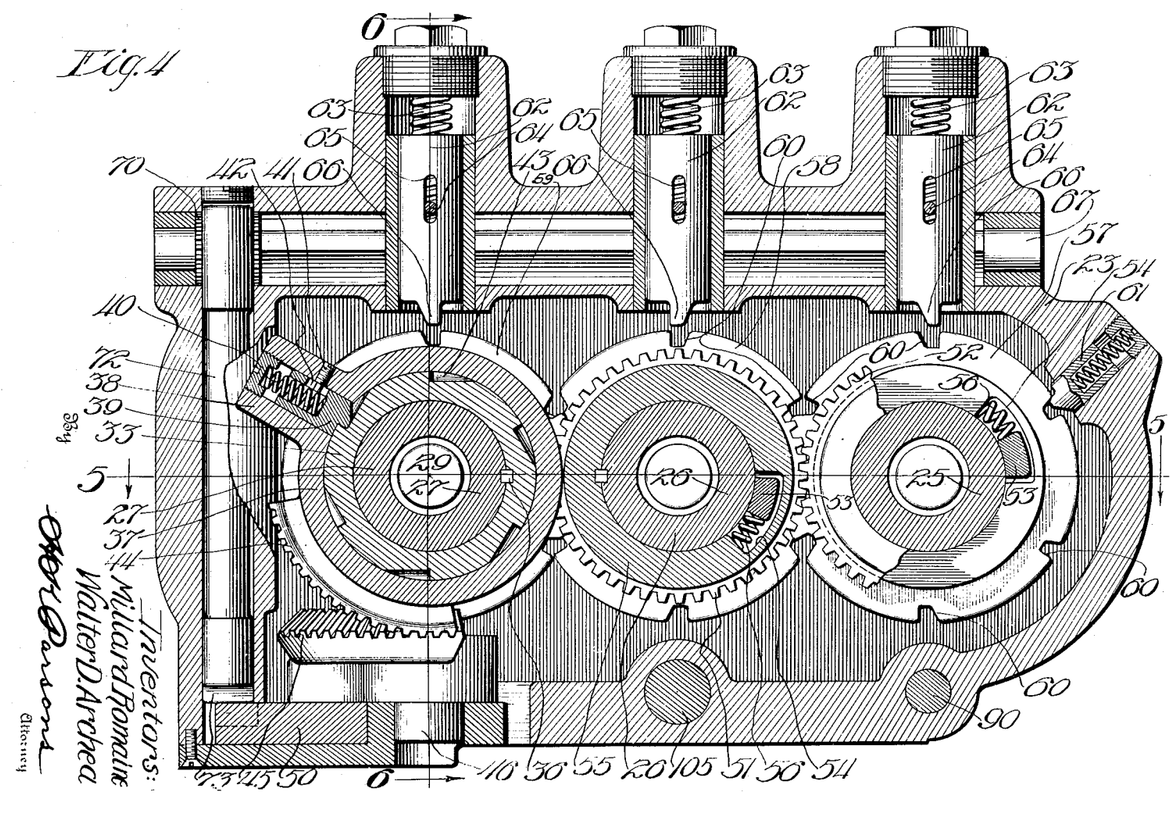
Figure 4 is an enlarged vertical section through the indexing mechanism taken as on the line 4—4 of Figure 3.
Figure 5:
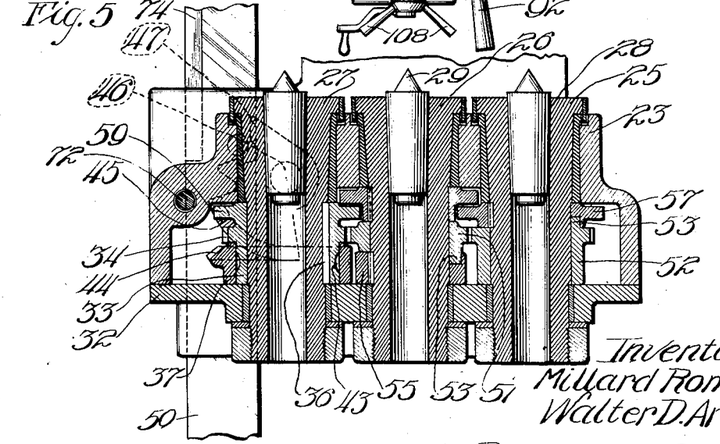
Figure 5 is a horizontal section as on line 5—5 of Figure 4.
Figure 6:
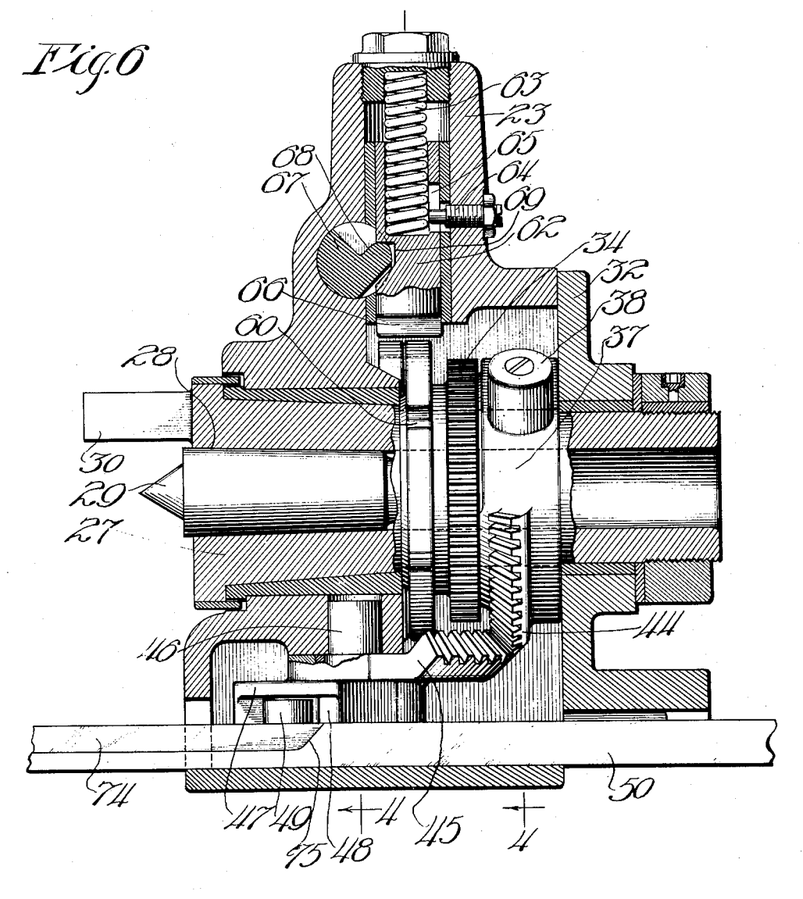
Figure 6 is a vertical sectional view as on the line 6—6 of Figure 4, parts being shown in elevation.

The structure in the headstock which controls the indexing of the work pieces will first be described. This mechanism is shown as an entirety in Figure 4. Rotatably supported within the casing 23 are a plurality of sleeve members 25, 26 and 27, in this instance shown as three in number. These sleeve members have tapered sockets as at 28, to receive the work positioning pins 29. The sleeves are further provided with the drive lugs 30 for cooperation with the driving dog 31 on work piece 22. As these sleeve members are slightly different as respects their attached devices and indexing mechanism, description will first be made of the left hand member 27. This member like the others, is journaled in the cap plate 32 and has mounted thereon between its bearings a hub 33 bearing a gear 34 and an index plate 59. This hub is connected to the sleeve as by key 36 locking the two parts for movement in unison. Loosely encircling hub 33 is annulus 37 having the radially extending sleeve portion 38 within which is mounted pawl 39 inwardly actuated by spring 40 and held against rotative or twisting movement by pin 41 engaged in slot 42 of the pawl. This pawl is adapted for selective interlocking engagement in the several ratchet recesses 43, formed in the outer face of hub 33, whereby rotative movement of annulus 37 in a counter-clockwise direction will carry with it sleeve 27 and its associated parts while said parts will remain stationary during clockwise movement of annulus 37.

To impart an oscillatory movement to annulus 37, use is made of the gear segment 44 on annulus 37, meshing with a second mitre gear segment 45 pivotally supported within casing 23 as by stud 46. Integral with the gear segment is a control block 47 slotted as at 48 for engagement with shifter pin 49 on plate 50. This plate is secured to the bed at the side of the reciprocating table and as the table moves outwardly interengagement of pin 49 and member 47 will rock the segment. This structure is operative on the idle or return stroke of the machine to shift the parts to the position indicated in Figure 8, while as the parts are shifted inward the intermeshing of segments 44 and 45 swings sleeve 37 in a counter-clockwise direction and the interlocking of pawl 39 with the ratchet recesses 43 imparts a similar rotation to hub 33 and sleeve 27 which is splined thereto. On the return movement of the table the pawl will ride idly over the ratchet member to a new recess 43 ready to again index the mechanism on the next inward stroke.

Meshing with gear 34 is a second gear member 51 which is rotatably mounted upon sleeve 26. This gear in turn meshes with gear 52 rotatably mounted on sleeve 25. Each of these gears is provided with a laterally projecting lug as indicated at 53, projecting into an arcuate recess 54 of a collar 55 keyed on the contained sleeve. A compression spring 56 is interposed between the wall of the recess in the direction in which lug 53 is shifted by its gear and the lug itself so that on rotation of the gears the lugs 53 yieldingly impart a rotating movement to their supporting sleeves through the medium of said springs and collars. The three sleeves, 25, 26 and 27 are respectively provided with index discs or plates 57, 58 and 59, each formed with a plurality of slots 60 corresponding in number to the number of stations desired and consequently corresponding in number to the number of operative ratchet recesses 43. A spring pressed detent 61 carried by the casing 23 rides on the periphery of one of these index discs and serves to hold the mechanism against accidental backward movement as through friction of pawl 39. This pawl engages in the respective recesses 60 as will be clearly understood by reference to Figure 4.

In order that the several sleeves and thus the work pieces indexed thereby may be most accurately positioned at each indexing movement, use is made of lock plungers 62 slidably supported by frame 23 and urged in the direction of the index plates by springs 63. Pins 64 riding in slot 65 of the plungers lock them against accidental rotation while the plungers are provided at their lower ends with the wedging latch portions 66 adapted to firmly seat themselves in one of the notches 60 of the index plates, the taper faces of the notches and latches being so disposed as to be capable of slightly advancing the index plates and sleeves in the same direction that the parts are urged by the compression springs 56 and the parts having interengaging straight faces for positively determining the final adjusted position of the parts.

Figure 7:
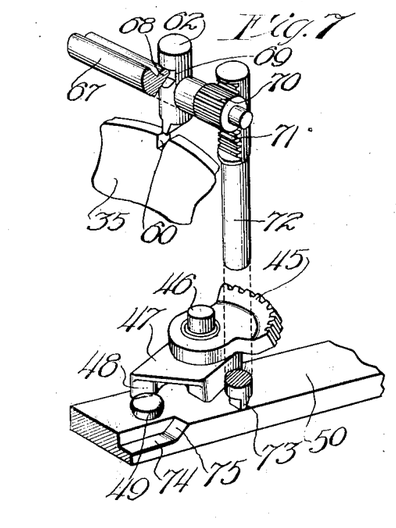
Figure 7 is a perspective view of the automatic indexing actuator.
Figure 8:
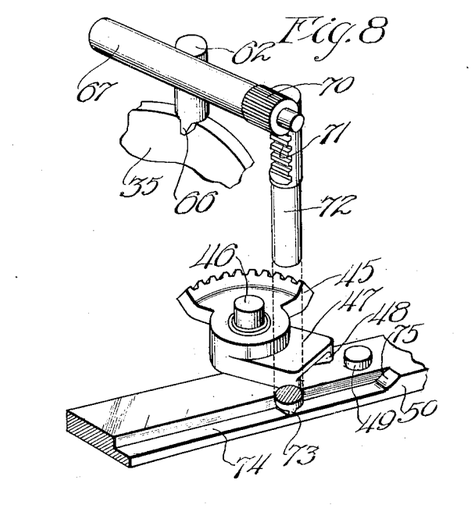
Figure 8 is a similar view with the parts in a different relationship.
Figure 9:
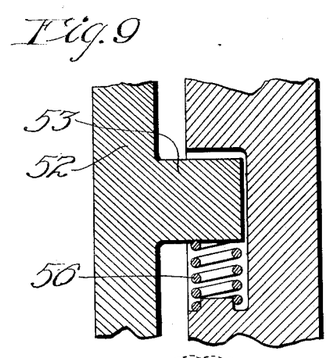
Figure 9 is a fragmentary section showing the connections between the drive gear and index plate.

The mechanism for actuating these latch bearing plungers will best be understood by reference to Figures 7 and 8, from which it will be seen that there is journaled in the casing 23 a rock shaft 67 having a tongue portion 68 interlocking with grooves 69 in the several plungers and having a pinion portion 70. This pinion meshes with rack 71 on shift rod 72 having a lower tapered contact portion 73 normally riding in groove 74 of plate 50. However, on the outward movement of the table, portion 73 rides up on cam surface 75 of the plate at the termination of the groove, thus forcing rod 72 upward and rocking shaft 67 to raise the locking plungers as shown in Figure 7. This takes place before pin 49 starts actuation of segment 45, so that the parts are satisfactorily released for the indexing movement. On the inward stroke of the table the rod 72 drops down into groove 74 as shown in Figure 8 under the urge of gravity supplemented by the action of spring 63 on plungers 62, forcing the plungers into locking engagement with the index plates 57 as is indicated in Figure 8. It will thus be noted that the operation of indexing and of locking the several sleeves in desired properly indexed position is automatically intermittently performed at the various strokes of the table.

Figure 3:
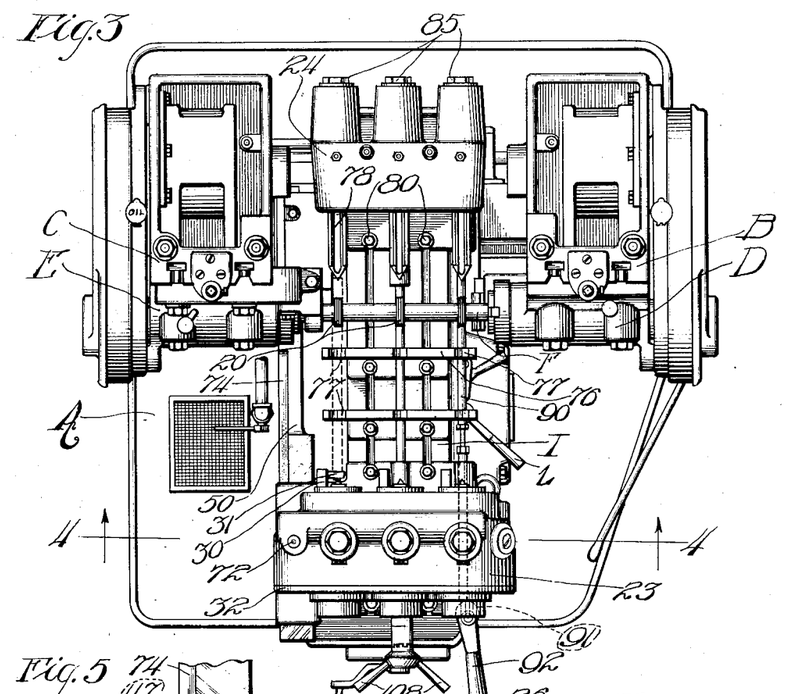
Figure 3 is a plan view of the complete machine.

To secure the work pieces in position, use is made of work positioning members 76 having notches 77 in which the work bars may be placed and which serve to satisfactorily line up the work pieces with the headstock spindles or points 29, and the tailstock spindles 78. These tailstock spindles are carried by a frame member 24 adjustably mounted on the table as by bolts 80 and correspond in number to the number of sleeves and headstock spindles. The spindles themselves are formed with upper and lower grooves 81 providing clearance for the cutters as they move forwardly therebeneath and with the hollow cylindrical guide portions 82 slidably mounted in cylinders 83 in the frame 24. Contained springs 84 bearing at one end against blocks 85 and at the other against the portions 82 urge the tailstock spindles in the direction of the work pieces. To facilitate withdrawal of the spindles or to disengage the work pieces and to hold them in such withdrawn positions while new work pieces are being substituted, use is made of rack 86 on portions 82, pinion 87 meshing with the rack and a second pinion 88 receiving its motion from rack 89 on shift rod 90. This rod extends to the front of the machine through frame piece 23 and at its forward end engages the cam head 91 on operating handle 92. Rocking of the handle into the position shown in Figure 3 presses rod 90 rearwardly and thus through the rack and pinion connections serves to rearwardly shift spindle 78 into disengaging position. Conversely lateral swinging of handle 92 brings a low point on the cam head to engagement with the rod when springs 84 may expand to move the tailstock spindles inwardly into the normal centers formed in the work, this engagement serving to lift the work out of engagement with the positioning members 76.

To insure proper operation of these clamping members and prevent one being held out of proper engagement due to slight variation in length of the several pieces, pinion 87 is secured to rock shaft 93 which is also provided with collars 94 having lugs 95 engaged in recesses 96 on the hubs of pinions 97 corresponding to pinion 87 with the exception that these pinions are loose upon the rock shaft. It will be noted that the recesses are greater in extent than lugs 95 with the result that there is a certain lost motion in the mechanism so that positive actuation of the right hand tailstock spindle causes this spindle to first disengage the work before the lost motion is taken up to draw back the other two tailstock spindles. Similarly on reengagement of the work, if the work pieces be of exactly the same length from center point to center point the right hand tailstock will be first released and the last to engage and back up its work piece, the other two having first been shifted by the springs to engage their work pieces and the rock shaft being capable of continued movement after the two left hand spindles have been limited in their movement by engagement with their respective work pieces.

Figure 15:
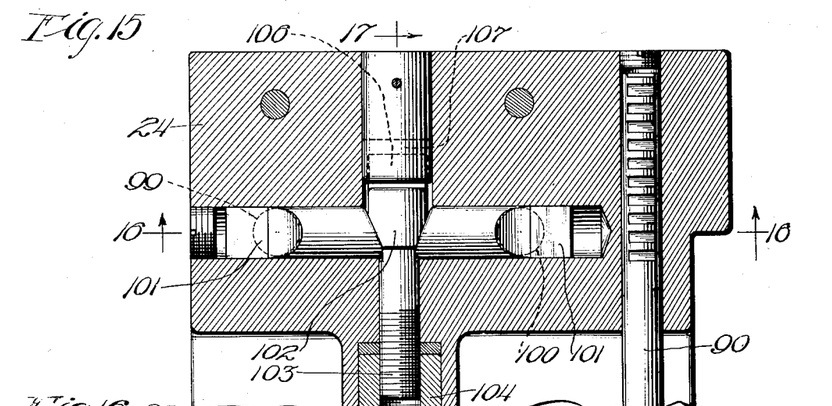
Figure 15 is a section on line 15—15 of Figure 12.
Figures 16, 17:
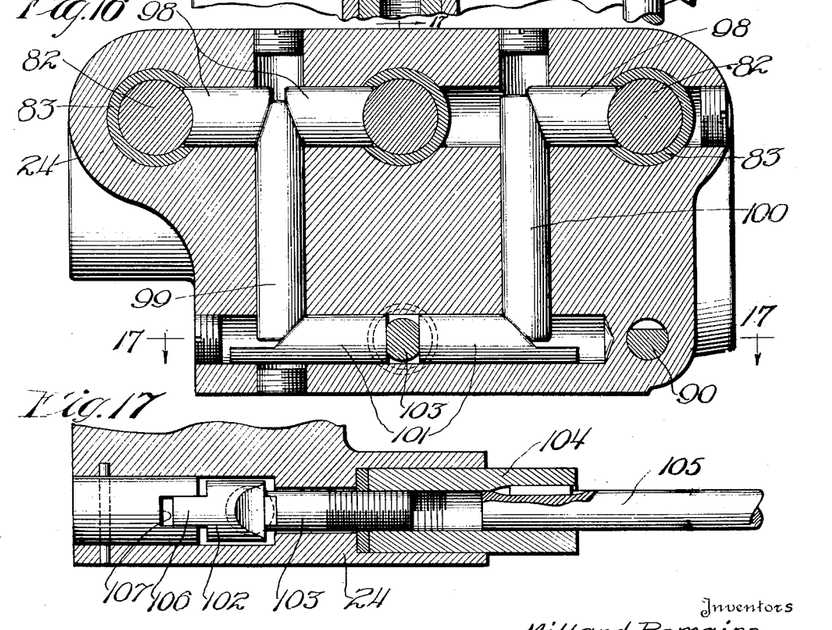
Figure 18:
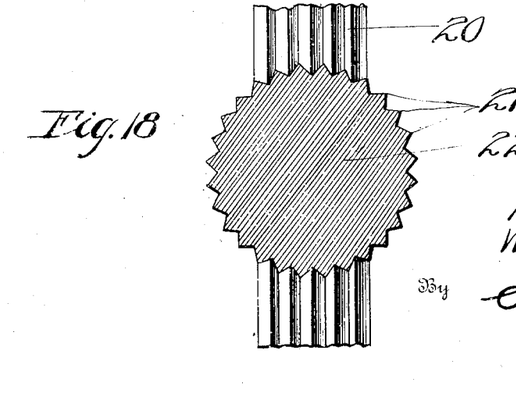

It will be understood that under working conditions considerable longitudinal strain is placed on the work as well as lateral pressure and it is necessary that the same be clamped with great rigidity rather than dependence being placed on spring retaining means only. To satisfactorily accomplish this result, use may be made of the clamping mechanism particularly illustrated in Figures 15, 16 and 17. This mechanism comprises the wedge blocks 98 laterally shiftable into clamping engagement with the members 82 to clampingly press them against the guide bushings therefor which are mounted in the frame unit 24. Wedge plungers 99 and 100 operated by wedges 101 serve to shift members 98 into clamping position as the wedges 99—100 are raised while when the presure of the wedges 101 is released gravity tends to disengage members 99 and 100 and release the clamping pressure. To actuate the wedges 101 use is made of the double taper cone wedge 102, having the forwardly extending threaded shank 103 engaged in threaded sleeve 104, keyed to the end of rod 105. This cone member 102 has a tongue 106 slidable in guide slot 107 to permit of in and out movement of the wedge while securing same against rotation. Rod 105 extends to the front of the machine and is provided with handles 108 for rotating the sleeve to impart an in and out movement to the wedge to clamp or release the members 98 as desired. It will thus be noted that the entire engagement and release of the work pieces is readily effected from the front of the machine, in that the tailstock spindle clamp devices are first released by rotation of rod 105 through the front handles 108 and the several spindles themselves subsequently shifted through rocking of handle 92.

Figure 10:
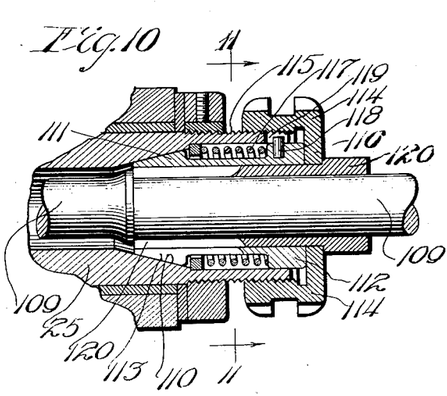
Figure 10 is a detail sectional view of a draw-in collet.
Figure 11:
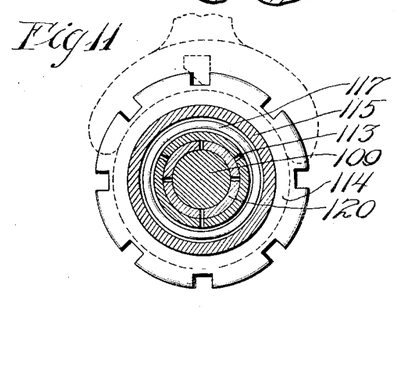
Figure 11 is a section on line 11—11 of Figure 10.
Figure 12:
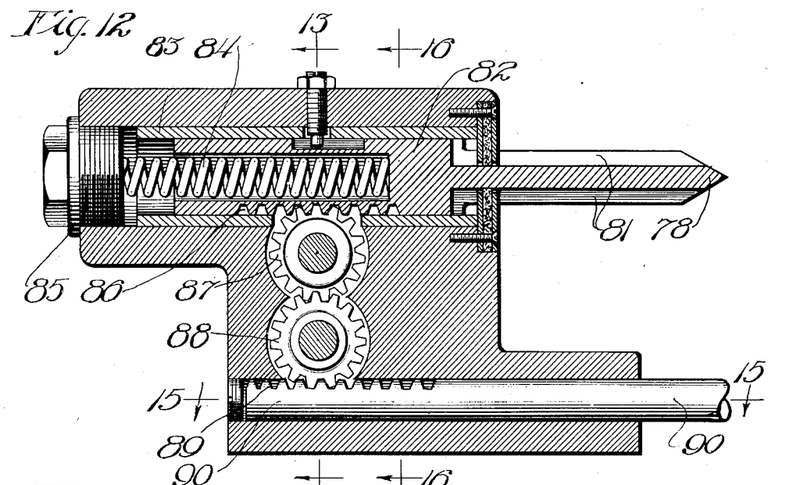
Figure 12 is a vertical section through the tailstock spindle control mechanism.
Figure 13:
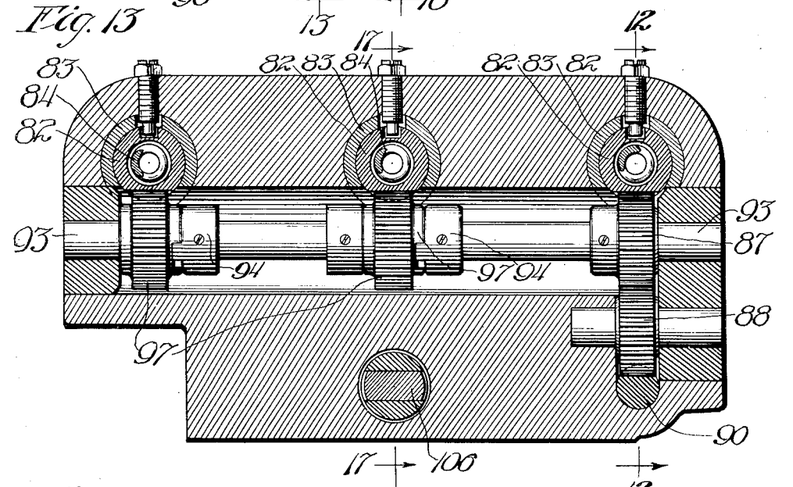
Figure 13 is a transverse section as on the line 13—13 of Figure 12.
Figure 14:
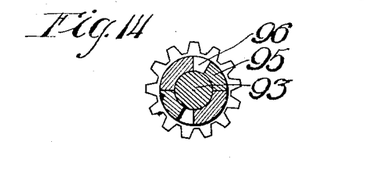
Figure 14 is a detail section showing the lost motion connection between certain of the tailstock gears and their actuating shaft.

In some instances the length of the work piece is such that the entire work piece cannot be satisfactorily supported between noses 29 and the tailstock spindles 78. In this event, use may be made of the securing members particularly illustrated in Figures 10 and 11. The sleeves 25, 26 and 27 have their central bores left open to receive the work pieces 109 and are provided with the interior cone sockets 110, interengaging with the cone nose 111 of clamp sleeve 112, which is slotted as at 113 to permit of inward springing of the several sections thereof as the cone point is forced into the socket. This inward movement is effected by rotation of nut 114 which is threaded on the rear portion 115 of member 25 and has a depending flange 116 rearwardly engaging member 112. A spring 117 serves to urge member 112 outwardly into released position, while a pin and slot connection 118—119 holds the member against rotation to prevent any twisting action against the work during the clamping or releasing of same. To actually secure the work to the sliding clamp member 112, use is made of the slotted resilient collet 120 which fits within the clamp member 112 and around the work as will be clearly understood by reference to Figures 10 and 11.

From the foregoing description taken in connection with the drawings, the construction of the present improved multiple indexing milling machine should be readily understood and it will be seen that there has been provided a machine capable of handling a plurality of work pieces simultaneously, which will grasp the work and position it within the machine in a substantially automatic manner and in which the actual indexing of the several work pieces in a step by step manner is performed with extreme accuracy to exactly properly relate each individual work piece to the particular cutter or cutters operating thereon. It will further be noted that in both the indexing of the parts and the clamping of the parts in position within the machine there is a corelation of the operating mechanisms for the individual parts, insuring the general corresponding joint shifting movement thereof, but that there is in addition a possibility of relative movement of the parts independently of each other, whereby the final accurate positioning is accomplished.

It will be further noted that the present machine has provided an improved method of multiple indexing of work pieces which is entirely automatic in its operation; which insures proper indexing movement on each idling stroke of the machine, and which serves to satisfactorily position and securely clamp the several work pieces in newly indexed position prior to the shifting of the table to operatively relate the work and cutters.

We claim:—

1. A machine of the character described, including a headstock member having a plurality of rotatable work supporting members mounted therein, means for positively imparting a predetermined rotation to one of said members, resilient connections between said member and the other members for yieldingly imparting substantially corresponding amounts of rotation thereto, and means individually engaging the several rotary members for positively controlling the exact amount of rotation imparted thereto.

2. A machine of the character described including a headstock member having a plurality of rotatable work supporting members mounted therein, means for positively imparting a predetermined rotation to one of said members, resilient connections between said member and the other members for yieldingly imparting substantially corresponding amounts of rotation thereto, and means individually engaging the several rotary members for positively controlling the exact amount of rotation imparted thereto, said means including index plates carried by the individual rotatable members and locking plungers having portions for cooperation with said index plates.

3. A machine of the character described including a headstock member having a plurality of rotatable work supporting members mounted therein, means for positively imparting a predetermined rotation to one of said members, resilient connections between said member and the other members for yieldingly imparting substantially corresponding amounts of rotation thereto, means individually engaging the several rotary members for positively controlling the exact amount of rotation imparted thereto, said means including index plates carried by the individual rotatable members and locking plungers having portions for cooperation with said index plates, and additional means cooperating with one of said index plates for locking the several members against accidental reverse rotation.

4. A work position controlling mechanism for a milling machine or the like, including a headstock casing, a plurality of members rotatably supported by the casing, a gear fixed on one of said members, gears loosely mounted on the other members, said gears being in intermeshing engagement one with the other, means resiliently coupling the last mentioned gears with their members, disks carried by the several rotatable members and having positioning notches, and spring actuated plunger members engageable in the notches for regulating the position of the rotatable members, the yieldable connection between certain of the members and their gears permitting of relative adjusting movement of the rotatable members with respect to said gears.

5. A Work position controlling mechanism for a milling machine or the like, including a headstock casing, a plurality of members rotatably supported by the casing, a gear fixed on one of said members, gears loosely mounted on the other members, said gears being in intermeshing engagement one with the other, means resiliently coupling the last mentioned gears with their members, disks carried by the several rotatable members having positioning notches, and spring actuated plunger members engageable in the notches for regulating the position of the rotatable members, the yieldable connection between certain of the members and their gears permitting of relative adjusting movement of the rotatable members with respect to said gears, a pawl and ratchet connection for imparting a rotative movement in one direction to the member with the fixed gear, means for automatically oscillating said pawl, and means engaging one of the notched disks for securing the parts against accidental reverse rotation on the idling stroke of the pawl.

6. A milling machine for producing circumferentially arranged teeth on a circular work piece, including a pair of spaced cutter bearing arbors, opposed cutters on the arbors, each having a multiple grooved arcuate face corresponding to the arcuate shape of the work piece, the grooves being substantially V-shaped and lying in planes at right angles to the axis of the cutter, said face adapted to produce a plurality of completed teeth on a circular work piece, means for passing the work piece between the opposed cutters, whereby a series of teeth are simultaneously produced on diametrically opposite portions of the work piece, and means for intermittently indexing the work piece to present contiguous portions to the opposed cutters.

7. A machine for milling a peripheral series of teeth on a circular article, including spaced cutter arbors bearing opposed cutters, said cutters having their peripheral faces of concave arcuate formation corresponding to the arcuate shape of the circular article and provided with a plurality of substantiallly V-shaped grooves lying in planes at right angles to the axis of the cutter, whereby a single cut thereof will produce a plurality of completed teeth on a circular work piece, means for axially shifting the work piece into and out of engagement with the cutters, and automatic means operable on shifting of the workpiece when out of engagement with the cutters, for indexing the work piece to present new surfaces to the cutters on the next feeding stroke thereof.

8. In a machine of the character described, the combination with a frame or support of a table reciprocatable thereon, a plurality of indexable head stock members carried by the table and having notched index plates, plunger members for engagement with the plates to lock the several head stocks in indexed position, and means for automatically controlling the indexing action including a stationary cam, a plunger carried by the table and traversing the cam on movement of the table, means coupling said plunger with the individual index plungers for shifting same into inoperative position at a given point in the movement of the table, a control block pivotally supported by the table and reciprocatable therewith and oscillatable relative thereto, means on the frame for positively oscillating the control block in one direction as the table completes its movement in that direction and for reversely oscillating the block at the inception of the return stroke of the table, a gear segment carried by the block, and motion transmitting connections between the segment and the head stock members for indexing the latter upon oscillation of the block in one direction.

9. In a machine of the character described, the combination with a frame or support of a table reciprocatable thereon, a plurality of indexable head stock members carried by the table and having notched index plates, plunger members for engagement with the plates to lock the several head-stocks in indexed position, and means for automatically controlling the indexing action including a stationary cam, a plunger carried by the table and traversing the cam on movement of the table, means coupling said plunger with the individual index plungers for shifting same into inoperative position at a given point in the movement of the table, a control block pivotally supported by the table and reciprocatable therewith and oscillatable relative thereto, means on the frame for positively imparting a back and forth oscillation to the control block during the completion and reversal of stroke of movement of the table, a gear segment carried by the block, and motion transmitting connections between the segment and the head stock members for indexing the latter upon oscillation of the block in one direction, said connections including a one way ratchet mechanism whereby the head stocks are unaffected on reverse oscillation of the control block.

10. In a multiple milling machine of the character described including a table member and a plurality of head stocks carried thereby for engagement with one end of individual work pieces, of means for selectively engaging and supporting the opposite ends of the work pieces including a plurality of tail stock members supported by the table for individual sliding movement relative thereto to cooperate with and retain work pieces in engagement with their respective head stocks, means for individually, resiliently actuating the tail stock spindles in the direction of the head stocks, a common actuator for retracting the several tail stock spindles, and lost motion connections between said actuator and the individual spindles to permit of automatic adjustment of the individual engagement between the spindles and their respective work pieces.

11. In a multiple milling machine of the character described including a table member and a plurality of head stocks carried thereby for engagement with one end of individual work pieces, of means for selectively engaging and supporting the opposite ends of the work pieces including a plurality of tail stock members supported by the table for individual sliding movement relative thereto to cooperate with and retain work pieces in engagement with their respective head stocks, means for individually, resiliently actuating the tail stock spindles in the direction of the head stocks, a common actuator for retracting the several tail stock spindles, lost motion connections between said actuator and the individual spindles to permit of automatic adjustment of the individual engagement between the spindles and their respective work pieces, individual clamp members for the respective spindles, and a single actuator for simultaneously clamping the individual spindles in engagement with their respective work pieces.

12. In a multiple milling machine of the character described including a table member and a plurality of head stocks carried thereby for engagement with one end of individual work pieces, of means for selectively engaging and supporting the opposite ends of the work pieces including a plurality of tail stock members supported by the table for individual sliding movement relative thereto to cooperate with and retain work pieces in engagement with their respective head stocks, means for individually, resiliently actuating the tail stock spindles in the direction of the head stocks, a common actuator for retracting the several tail stock spindles, lost motion connections between said actuator and the individual spindles to permit of automatic adjustment of the individual engagement between the spindles and their respective work pieces, individual clamp members for the respective spindles, and a single actuator for simultaneously clamping the individual spindles in engagement with their respective work pieces, said clamping mechanism including equalizers interposed between the actuator and the individual spindle clamps for insuring equal clamping pressure against the several spindles.

13. In a milling machine having a bed, cutter spindles supported thereby, a table reciprocably mounted on the bed for movement relative to said spindles and a headstock having a plurality of spindles carried by the table at one end thereof, the combination of a tailstock member having a plurality of tailstock spindles mounted on the table on the side of the cutter opposite to the headstock, a plurality of individual mechanisms in the tailstock for reciprocating the respective spindles, a joint actuator therefor, an operating member carried by the headstock at the opposite side thereof from the tailstock, and motion transmitting connections between the operating member and the common actuator whereby the tailstock spindles may be retracted from a position adjacent the headstock.

14. In a milling machine having a bed, cutter spindles supported thereby, a table reciprocably mounted on the bed for movement relative to said spindles and a headstock having a plurality of spindles carried by the table at one end thereof, the combination of a tailstock member having a plurality of tailstock spindles mounted on the table on the side of the cutter opposite to the headstock, a plurality of individual mechanisms in the tailstock for reciprocating the respective spindles, a joint actuator therefor, cam means rotatably mounted in the headstock, means actuated by the cam upon rotation in one direction to operate said common actuator and effect retraction of the tailstock spindles, and additional means for effecting engagement of the tailstock spindles with individual work pieces upon rotation of the cam in the opposite direction, and manual means for operating said cam whereby the tailstock spindles may be operated from the headstock end of the table.

15. A tailstock mechanism for a milling machine including a frame, cutter spindles supported thereby, a table reciprocably mounted on the bed for movement relative to said spindles, a headstock member carried by the table at one end thereof, said tailstock being mounted on the table on the side of the cutter opposite to the headstock comprising a number of tailstock spindles journaled in the member, a common operating shaft journaled in the member, individual rack and gear connections coupling the spindles to the shaft for oscillation thereby, individual clamping members associated with each spindle, a common actuator for said clamps, individual operating members associated with the headstock for operating each of said common actuators whereby the tailstock spindles may be reciprocated and clamped from a position adjacent to the headstock of the machine.

MILLARD ROMAINE.
WALTER D. ARCHEA.